(12) United States Patent
MacGougan et al.

(10) Patent No.: US 9,791,572 B2
(45) Date of Patent: Oct. 17, 2017

(54) BATCH PROCESSING FOR IMPROVED GEOREFERENCING

(71) Applicant: Apple Inc., Cupertino, CA (US)

(72) Inventors: Glenn Donald MacGougan, San Jose, CA (US); Robert Mayor, Half Moon Bay, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 14/501,381

(22) Filed: Sep. 30, 2014

(65) Prior Publication Data

US 2015/0334678 A1 Nov. 19, 2015

Related U.S. Application Data

(60) Provisional application No. 61/994,765, filed on May 16, 2014.

(51) Int. Cl.
| | |
|---|---|
| *G01S 19/06* | (2010.01) |
| *G01S 19/27* | (2010.01) |
| *G01S 19/22* | (2010.01) |
| *H04W 64/00* | (2009.01) |
| *H04W 4/02* | (2009.01) |
| *G01S 19/49* | (2010.01) |

(Continued)

(52) U.S. Cl.
CPC .......... *G01S 19/22* (2013.01); *G01S 5/0036* (2013.01); *G01S 5/0242* (2013.01); *G01S 5/0263* (2013.01); *G01S 19/49* (2013.01); *H04W 4/02* (2013.01); *H04W 4/023* (2013.01); *H04W 4/185* (2013.01); *H04W 64/00* (2013.01); *H04W 64/003* (2013.01); *H04W 4/027* (2013.01)

(58) Field of Classification Search
USPC ........................ 701/451; 342/357.43, 357.66
See application file for complete search history.

(56) References Cited

U.S. PATENT DOCUMENTS

| | | | |
|---|---|---|---|
| 6,961,562 | B2 | 11/2005 | Ross |
| 7,236,091 | B2 | 6/2007 | Kiang et al. |

(Continued)

OTHER PUBLICATIONS

Edge, WO 2007/056738, "Positioning for WLANs and other wireless networks", Aug. 30, 2007, 25 pages.

(Continued)

*Primary Examiner* — Adam Tissot
(74) *Attorney, Agent, or Firm* — Fish & Richardson P.C.

(57) ABSTRACT

Crowd-sourced location data from client devices is processed using enhanced filtering techniques in non-realtime by a centralized server process to improve the accuracy and reliability of georeferenced geodata. At a server computer, enhanced filtering techniques make use of future information to improve georeferencing of the geodata. In some implementations, the server computer can be configured to implement batch processing of raw GNSS data and other crowd-sourced location data (e.g., wireless scan data, inertial sensor data) using, for example, a smoothing filter or batch estimator. Augmentation data (e.g., satellite ephemeris data, clock offset and ionospheric delay) and sensor data independent of client devices can also be used by the server computer to augment the crowd-sourced location data to further improve georeferencing of geodata.

20 Claims, 6 Drawing Sheets

(51) Int. Cl.
*G01S 5/00* (2006.01)
*G01S 5/02* (2010.01)
*H04W 4/18* (2009.01)

(56) References Cited

U.S. PATENT DOCUMENTS

| | | |
|---|---|---|
| 7,319,878 B2 | 1/2008 | Sheynblat et al. |
| 7,764,231 B1 | 7/2010 | Karr et al. |
| 8,098,590 B2 | 1/2012 | Catovic et al. |
| 8,311,018 B2 | 11/2012 | Carlson et al. |
| 8,391,889 B2 | 3/2013 | Marti et al. |
| 8,483,719 B2 | 7/2013 | Eitan et al. |
| 8,600,297 B2 | 12/2013 | Ketchum et al. |
| 2005/0130672 A1 | 6/2005 | Dean et al. |
| 2006/0009235 A1 | 1/2006 | Sheynblat et al. |
| 2007/0002813 A1 | 1/2007 | Tenny et al. |
| 2008/0019317 A1 | 1/2008 | Vellanki et al. |
| 2008/0123608 A1 | 5/2008 | Edge et al. |
| 2008/0227462 A1 | 9/2008 | Freyman et al. |
| 2009/0280829 A1 | 11/2009 | Feuerstein |
| 2009/0310501 A1 | 12/2009 | Catovic et al. |
| 2010/0056185 A1 | 3/2010 | Lamba |
| 2010/0156706 A1 | 6/2010 | Farmer et al. |
| 2010/0159885 A1 | 6/2010 | Selgert et al. |
| 2010/0159949 A1 | 6/2010 | Selgert et al. |
| 2010/0183134 A1 | 7/2010 | Vendrow et al. |
| 2010/0210285 A1 | 8/2010 | Pande et al. |
| 2010/0240339 A1 | 9/2010 | Diamond |
| 2010/0240397 A1 | 9/2010 | Buchmayer et al. |
| 2011/0057836 A1* | 3/2011 | Ische .................... G01S 5/0009 342/357.43 |
| 2012/0002563 A1 | 1/2012 | Flanagan |
| 2012/0309428 A1 | 12/2012 | Marti et al. |
| 2013/0178230 A1 | 7/2013 | Marti et al. |
| 2013/0288709 A1 | 10/2013 | Flanagan |

OTHER PUBLICATIONS

Gelb A.; Kasper, J.F., Jr.; Nash, R.A., Jr., Price, C.F.; Sutherland, A.A., Jr. *Applied Optimal Estimation;* Gelb, A. Ed.; The MIT Press: Cambridge, MA, USA, 1974; pp. 156-170, 180-189.

* cited by examiner

BATCH PROCESSING FOR IMPROVED GEOREFERENCING

CROSS-REFERENCE TO RELATED APPLICATION

This application claims priority to U.S. Provisional Patent Application No. 61/994,765, entitled "Batch Processing for Improved Georeferencing," filed May 16, 2014, the entire contents of which are incorporated herein by reference.

TECHNICAL FIELD

This disclosure relates generally to georeferencing.

BACKGROUND

Georeferencing generally describes the process of locating an entity in real world coordinates by determining its latitude, longitude and altitude coordinates. The crowd-sourcing of location information (e.g., position, velocity, time) and associated geodata (e.g., WiFi MAC addresses, Bluetooth beacon identifiers) is an important process for effectively georeferencing geodata. Global Navigation Satellite Systems (GNSS), such as Global Positioning System (GPS) and GLONASS are often used to estimate the location of client devices such as smartphones, tablet computers, wearable computers and the like. The collection and uploading of crowd-sourced location data and geodata to a centralized server for improved georeferencing of the geodata can result in improved location estimations of client devices.

SUMMARY

Crowd-sourced location data from client devices are processed using enhanced filtering techniques in non-realtime by a centralized server process to improve the accuracy and reliability of georeferenced geodata. At a server computer, enhanced filtering techniques make use of future information to improve georeferencing of the geodata. In some implementations, the server computer can be configured to implement batch processing of raw GNSS data and other crowd-sourced location data (e.g., wireless scan data, inertial sensor data) using, for example, a smoothing filter or batch estimator. Augmentation data (e.g., satellite ephemeris data, clock offset and ionospheric delay) and sensor data independent of client devices can also be used by the server computer to augment the crowd-sourced location data to further improve georeferencing of geodata. The sensor data can include inertial sensor data (e.g., accelerometer, gyro, barometer, magnetometer data) crowd-sourced from the client devices or sensor data from augmentation data sources that are independent of the client devices (e.g., vehicle speed data from traffic management systems). The more precise georeferenced geodata can be served or pushed to applications running on client devices.

Other implementations are directed to systems, devices and computer-readable storage mediums. Particular implementations disclosed herein provide one or more of the following advantages. Raw GNSS measurements and other crowd-sourced data and augmentation data are used with enhanced filtering techniques by a centralized server process that makes use of future information instead of being limited to realtime state estimations. The result of the enhanced filtering techniques is improved accuracy and reliability of georeferenced geodata. More accurate and reliable georeferencing can also improve the results of a variety of applications, such as more accurate location estimates of client devices using network-based positioning systems, improved lane-by-lane traffic analysis, more accurate point of interest (POI) data in multi-path signal environments and the ability to reprocess raw measurements as estimation techniques improve and additional crowd-sourced location data becomes available.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
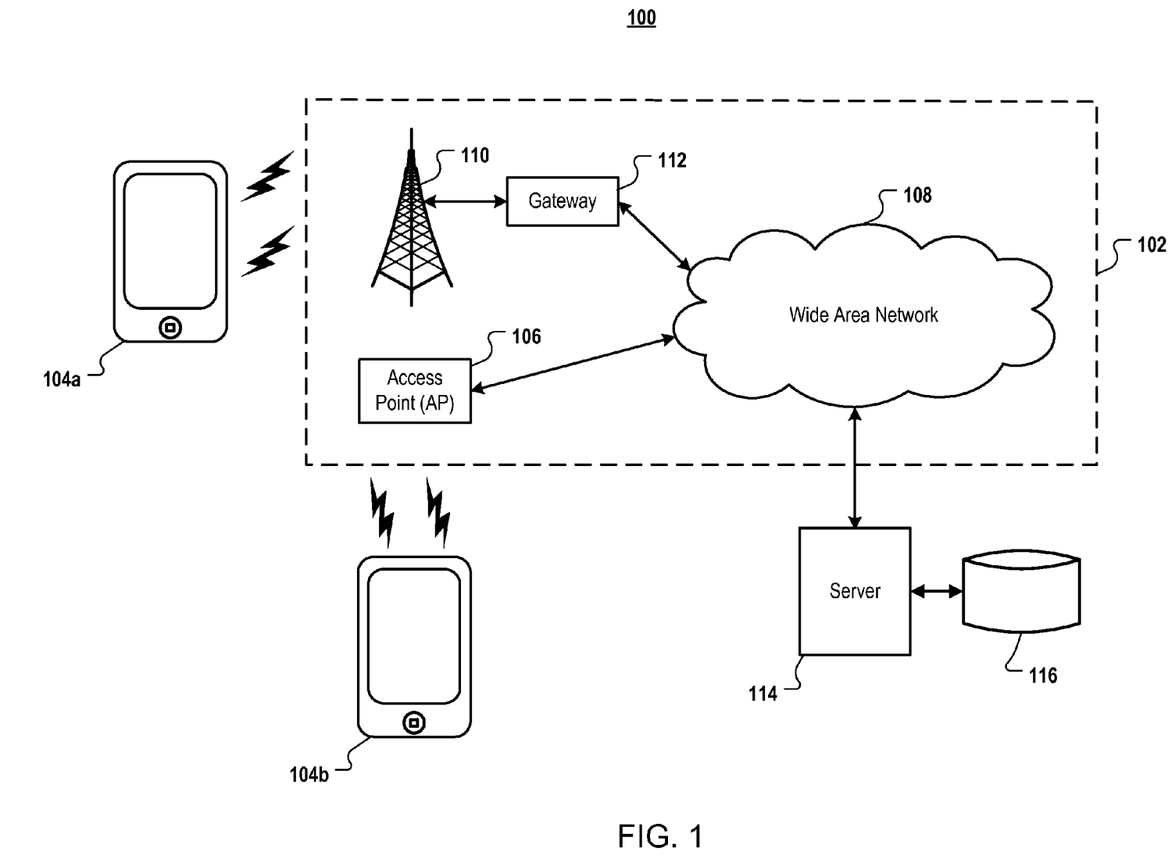
FIG. 1 illustrates an example operating environment for using crowd-sourced location data for georeferencing geodata.

FIG. 1 illustrates an example operating environment for using crowd-sourced location data for georeferencing geodata. In some implementations, system 100 can include wireless network 102 coupled to wireless client devices 104. A first client device 104a accesses wireless network 102 through cell tower 110 and gateway 112. A second client device 104b accesses wireless network 102 through access point (AP) 106. Gateway 112 and AP 106 are coupled to wide area network 108 (e.g., the Internet). Also coupled to network 108 is server 114 coupled to storage device 116.

In practice, system 100 can have many client devices, gateways, access points and servers. Network 108 can include subnetworks, each being implemented using networking hardware and software. Typical networking hardware includes routers, network bridges, switches, hubs, and repeaters, multilayer switches, protocol converters, bridge routers, proxy servers, firewalls, network address translators, multiplexers, network interface controllers, wireless network interface controllers, modems, ISDN terminal adapters, line drivers, networking cables and other related hardware.

Client devices 104 can be any wireless device capable of communicating with server 114, including but not limited to smartphones, tablet computers and wearable computers. In some implementations, client devices 104 can include the architecture described in reference to FIG. 7.

Server 114 can be a single server computer or multiple server computers operated by a service provider. Server 114 can be implemented using the architecture described in reference to FIG. 8.

System 100 collects crowd-sourced location data from client devices 104 and periodically uploads the location data to server 114 for batch processing. The crowd-sourced location data can include estimated location data (e.g., position, velocity, time) provided by GNSS receivers, wireless scan data (e.g., MAC addresses, signal strength measurements, timestamps) and inertial sensor data (e.g., data from accelerometers, gyros, barometers and magnetometers). In some implementations, the crowd-sourced location data includes raw GNSS data. As used herein, the term GNSS includes any system of satellites that provides autonomous geospatial positioning with global coverage. Generally, the term "raw" means not processed by a realtime state estimator.

If the GNSS receiver is a GPS receiver, the raw GNSS data can include but is not limited to: pseudo-ranges, delta pseudo-ranges, Doppler shift measurements and associated measurement timestamps. The position of client device 104 is estimated by the GPS receiver from the pseudo-range measurements received from multiple satellite vehicles (SVs) at a single measurement epoch. The pseudo-range measurements are used together with SV position estimates based on precise orbital elements (ephemeris data) sent by each SV to compute the SV positions in three dimensions at the measurement epoch. Four SVs can be used to estimate three dimensions of position (X, Y, Z) in a Cartesian coordinate frame and time. The three dimensions of position are estimated by the GPS receiver in Earth-Centered, Earth-Fixed (ECEF) coordinates using, for example, a continuous-discrete Extended Kalman Filter (EKF) or other state estimator. The EKF operates recursively in realtime on streams of noisy measurement data to produce a statistically optimal estimate of the system state, such as position and velocity, which can be expressed in geodetic coordinates (e.g., WGS84) as latitude, longitude, altitude and speed. The geodetic parameters are the parameters that are typically provided to applications running on client device 104 (e.g., a navigation application).

In addition to a GNSS receiver, client device 104 can include a wireless transceiver coupled to (or embedded in) client device 104. In some implementations, the GNSS receiver and wireless transceiver can be integrated on a single integrated circuit (IC). In some implementations, the wireless transceiver is configured to scan for Radio Frequency (RF) signals transmitted by wireless network access points (APs) (e.g., beacons, routers) that are located within communication range of client device 104. Client device 104 can collect wireless scan data using the wireless transceiver, such as received signal strengths and unique identifiers for AP hardware devices that were detected in the scan. An example signal strength indicator is a Received Signal Strength Indicator (RSSI). An example unique identifier is a Media Access Control (MAC) address.

The crowd-sourced location data can be uploaded to server 114 through wireless network 102 using software and hardware that implement known communication protocols, such as protocols implementing IEEE 802.xx (e.g., WiFi), 3G, 4G, LTE and Bluetooth technologies. Server 114 can store the uploaded data in storage device 116 (e.g., stored in a database). The crowd-sourced location data provides numerous benefits for users of client devices 104 as well as important analytics. For example, the crowd-sourced location data can be used to estimate the locations of AP devices (e.g., routers, beacons) and to determine optimal locations for the AP devices in various outdoor or indoor operating environments.

Using crowd-sourced, processed GNSS data and wireless scan data to georeference APs of a wireless network is described in U.S. patent application Ser. No. 13/153,069, for "Location Estimation Using A Probability Density Function," filed Jun. 3, 2011, which patent application is incorporated by reference herein in its entirety.

Example Client/Server Systems

Figure 2:
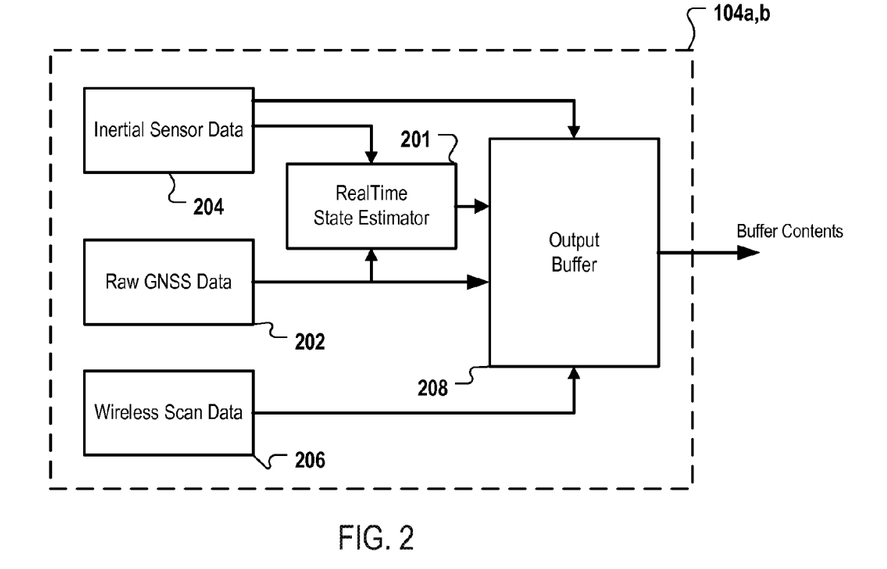
FIG. 2 is a block diagram of example client device system for providing crowd-sourced data to a server for georeferencing geodata.

FIG. 2 is a block diagram of example client device system for providing crowd-sourced data to a server for georeferencing geodata. In some implementations, client device 104 includes realtime state estimator 201, raw GNSS data 202, inertial sensor data 204, wireless scan data 206 and output buffer 208.

Realtime state estimator 201 can be implemented in a GNSS receiver embedded in, or coupled to, client device 104 using, for example, an EKF. Realtime estimator 201 receives raw GNSS data 202, which is calculated by the GNSS receiver using RF signals received from the GNSS satellites. Some examples of raw GNSS data are pseudo-range, delta pseudo-range, Doppler shift measurements and associated measurement timestamps. Realtime state estimator 201 also receives inertial sensor data 204 from inertial sensors of client device 104 including, for example, data output by accelerometers, angular rate sensors (e.g., gyro), barometers, altimeters and magnetometers. This data can be pre-processed (e.g., averaged) before being input into realtime state estimator 201. The output of realtime state estimator 201 can include estimates of the current longitude, latitude and altitude of client device 104 in a geodetic coordinate system (e.g., WGS84). Other states may also be output, such as velocity or speed of client device 104. Raw GNSS data 202 and the output of realtime state estimator 201 can be stored in output buffer 208 (e.g., cache memory) for subsequent upload to server 114 for further processing, as described in reference to FIG. 3.

In addition to raw GNSS data 202, wireless scan data 206 can be provided by a wireless transceiver in client device 104 and stored in buffer 208 for subsequent upload to server 114. Some examples of wireless scan data include measurements of received signal strengths (e.g., RSSI values) from AP devices (e.g., WiFi router or beacon) detected in the wireless scan, AP identifiers (e.g., MAC addresses) and measurement timestamps indicating when the signal strength measurements were collected.

The contents of buffer 208 can be uploaded to server 114 on a scheduled basis (e.g., every hour) or in response to a trigger event (e.g., request from server 114), where it can be stored in database 116. The contents of buffer 208 were processed in realtime. Realtime processing in this context means the data is processed by realtime state estimator 201 while client device 104 is operating, as opposed to batch processing, which is a non-realtime operation that occurs at a later time on server 114. Batch processing has advantages over realtime data processing in that there is more time and processing power on server computer 114 than on a power-restricted client device 104, allowing for more complex or time intensive calculations that can often provide more accurate results than realtime data processing.

Figure 3:
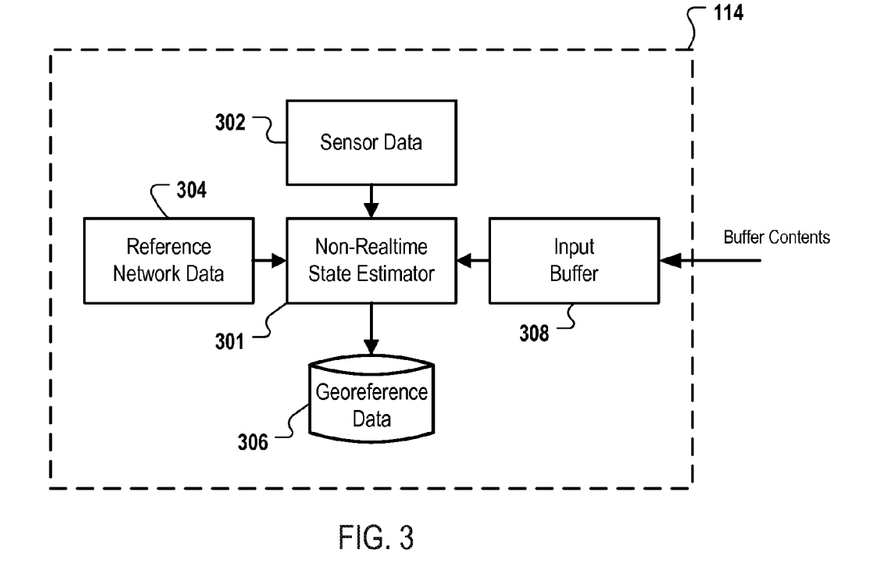
FIG. 3 is a block diagram of example server system for processing crowd-sourced location data for georeferencing geodata.

FIG. 3 is a block diagram of an example server system for processing crowd-sourced location data for georeferencing geodata. In some implementations, server 114 can include non-realtime state estimator 301, sensor data 302, reference network data 304, georeference data 306 and input buffer 308. The contents from output buffer 208 of client device 104 are uploaded into input buffer 308 on a scheduled basis or in response to a trigger event. The contents are processed by non-realtime state estimator 301, together with reference network data 304 and sensor data 302 (collectively, also referred to as "augmentation data") to provide georeferenced geodata 306, which can be served or pushed to client devices 104 or other client devices. The reference network data can include, for example, GNSS status reports transmitted by a National Institute of Standards and Technology (NIST) radio stations (e.g., WWV, WWVH) or International GNSS Service (IGS). Sensor data 302 can be realtime traffic data from cameras, speed sensors and other sensors provided by a Transportation Management Center (TMC) or other third party augmentation data source. In some implementations, the augmentation data can include differential GPS (DGPS) data or other assisted-GPS (AGPS) data. In some implementations, the augmentation data includes data for reducing spatially or temporally correlated measurement error sources.

In some implementations, the contents of input buffer 308 can be processed using enhanced filtering techniques, including, for example, a batch estimator or a forward-backward smoothing filter (e.g., Rauch-Tung-Striebel (RTS) smoother). The batch estimator can be implemented as an iterative least-squares estimator using known batch processing techniques. The smoothing filter can be a two pass process. The forward pass can be implemented by an EKF and the backward recursion is introduced to reduce the inherent bias in the EKF estimates. The backward recursion works backwards in time. The combination of the forward pass EKF and a backward recursion is considered to have utilized all available information. Thus, the non-realtime smoothing filter is capable of performing better estimations than the realtime EKF.

The EKF and the forward-backward smoothing filter is described in Gelb A.; Kasper, J. F., Jr.; Nash, R. A., Jr., Price, C. F.; Sutherland, A. A., Jr. Applied Optimal Estimation; Gelb, A. Ed.; The MIT Press: Cambridge, Mass., USA, 1974; pp. 156-170, 180-189, which pages are incorporated by reference herein in its entirety.

In some implementations, the smoothing filter can process crowd-sourced, raw GNSS measurements and inertial sensor measurements for georeferencing geodata. For example, crowd-sourced raw GNSS data can be uploaded to server 114 together with wireless scan data (e.g., WiFi scan data). Server 114 can filter the GNSS data with wireless scan data (e.g., RSSI values, MAC addresses) using a smoothing filter or batch estimator that is configured to process pseudo-range and delta pseudo-range measurements (or other raw GNSS data) and provide an estimated wireless scan location. Since the estimated wireless scan location provided by the smoothing filter is more accurate than the estimated wireless scan location calculated in realtime by the EKF running in the GNSS receiver on the client device 104, the locations of the wireless access points detected in the wireless scan are more accurately determined. More accurate wireless scan locations result in more accurate location estimates of client devices 104 using network-based positioning systems that rely on wireless access point locations and trilateration to calculate the location of client devices 104.

In some implementations, the forward pass EKF equations can be represented by the time and measurement update equations set forth below, where a minus superscript means before the measurement update and k is the number of time step, P is the state error covariance matrix, Q is the process noise matrix, R is the measurement noise matrix, K is the Kalman gain matrix, H is the Jacobian of the measurement equations, $\Phi$ is the state transition matrix and z is the measurement.

A. Time Update
1. Propagate state $$\hat{x}_k^- = \Phi \hat{x}_{k-1} + B u_{k-1} \quad [1]$$

2. Propagate error covariance $$P_k^- = \Phi P_{k-1} \Phi^T + Q \quad [2]$$

B. Measurement Update
1. Compute Kalman gain $$K_k = P_k^- H^T (H P_k^- H^T + R)^{-1} \quad [3]$$

2. Update estimate with measurement and Kalman gain $$\hat{x}_k = \hat{x}_k^- + K_k (z_k - H \hat{x}_k^-) \quad [4]$$

3. Update error covariance with Kalman gain $$P_k = (I - K_k H) P_k^- \quad [5]$$

In some implementations, the backward pass recursion equations are given below, where the time step number k=N−1, . . . , 0 and N is the final time step, A is the smoother gain matrix, P is the corresponding state error covariance matrix and $\hat{x}$ is the smoothed states of $k^{th}$ step.

$$A_k = P_k \Phi^T (P_k^-)^{-1} \quad [6]$$

$$\hat{x}_k = \hat{x}_k + A_k (\hat{x}_k - \hat{x}_k^-) \quad [7]$$

$$P_k = P_k^- + A_k [P_k - P_k] A_k \quad [8]$$

Example Client/Server Processes

Figure 4:
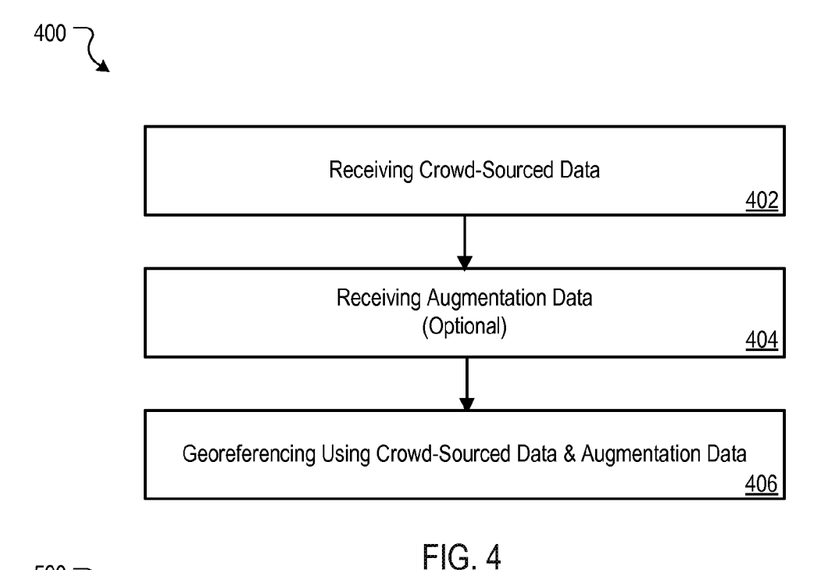
FIG. 4 is a flow diagram of example client device process for providing crowd-sourced location data to a server for georeferencing geodata.

FIG. 4 is a flow diagram of example client device process for providing crowd-sourced location data to a server for georeferencing geodata. Process 400 can be implemented by device architecture 700, as described in reference to FIG. 7.

In some implementations, process 400 can begin by receiving crowd-sourced data from client devices 402. The client devices can be mobile phones, tablet computers, wearable computers and the like. The crowd-sourced data can include raw GNSS data, wireless scan data, processed GNSS data and inertial sensor data. The raw GNSS data can be calculated by GNSS receivers (e.g., GPS receivers) embedded in or coupled to the client devices. The raw GNSS data can be buffered over time on the client devices and uploaded periodically to a server on a scheduled basis or in response to a trigger event.

Process 400 can continue by receiving augmentation data from reference network and/or sensors independent of the client devices 404. The augmentation data can be transmitted by, for example, a NIST radio station that may include satellite ephemeris data, clock drift, ionospheric delay, standard time intervals, time corrections and various other parameters that can be used for accurate georeferencing. The sensor data can be provided by, for example, a TMC and can include infrastructure sensor data, such as data from proximity sensors (e.g., RFIDs), cameras, fiber optic, etc.

Process 400 can continue by georeferencing geodata using the crowd-sourced data received from the client devices to georeference geodata 406. Optionally, the augmentation data can be used with the raw GNSS data to georeference geodata. For example, crowd-sourced raw GPS data (e.g., pseudo-range, delta pseudo-range, Doppler shift, timestamps), wireless scan data (e.g., RSSI values, MAC addresses) and inertial sensor data (e.g., accelerometer, gyro, barometer and magnetometer data) can be periodically uploaded to a centralized server process, where it is filtered by, for example, a batch estimator or a smoothing filter. The non-realtime batch estimator or the smoothing filter can provide a more accurate estimate of the wireless scan location than provided by the realtime EKF implemented in the GNSS receivers of the client devices.

Figure 5:
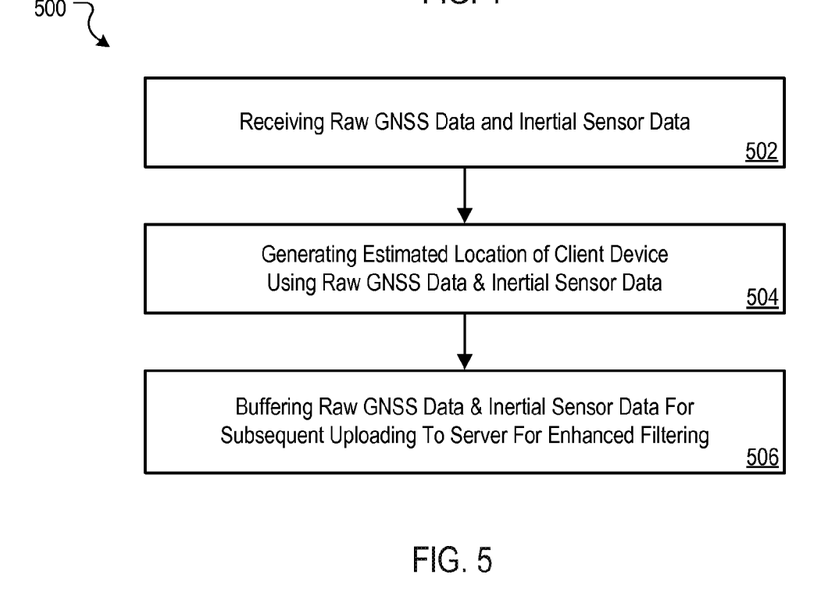
FIG. 5 is a flow diagram of example server process for processing crowd-sourced location data for georeferencing geodata.

FIG. 5 is a flow diagram of example server process for processing crowd-sourced location data for georeferencing geodata. Process 500 can be implemented by server architecture 800, as described in reference to FIG. 8.

In some implementations, process 500 can begin by receiving, at a client device, location data 502. Some of the location data, such as processed and raw GNSS data can be provided by a GNSS receiver, such as a GPS receiver embedded in or coupled to the client device. The location data can also include inertial sensor data provided by one or more inertial sensors of the client device, including without limitation accelerometers, gyros, barometers and magnetometers. The GNSS data and inertial sensor data can be input to an EKF implemented in a processor of the client device to produce an estimated current location of the client device 504, which can be used by applications running on the client device (e.g., navigation applications). The raw GNSS data, estimated current location and inertial sensor data can be buffered 506 and sent to a centralized server process for batch processing using enhanced filtering techniques such as, for example, a batch estimator or a smoothing filter.

Examples of Georeferencing Structures

Figure 6:
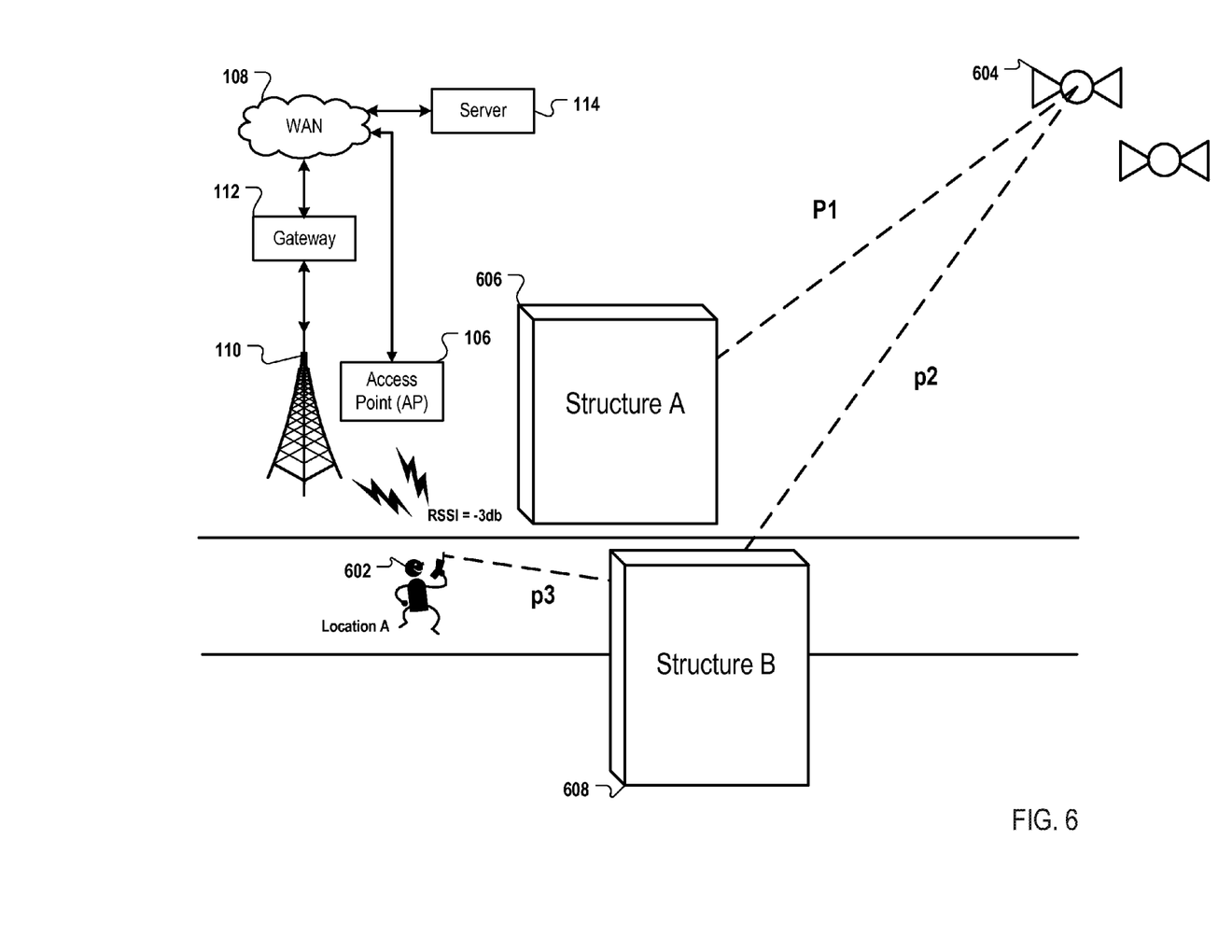
FIG. 6 illustrates using crowd-sourced location data in combination with radio frequency signatures for georeferencing geodata.

FIG. 6 illustrates using crowd-sourced location data in combination with radio frequency signatures for georeferencing geodata. In this simplified example, a user 602 standing at "Location A" is operating a client device with a GNSS receiver in an environment (e.g., a dense urban environment) that is subject to multi-path effects due to surrounding physical structures (e.g., structures A and B). In this scenario, an RF signal component from satellite 604 travels along the line-of-sight path P1 and is blocked by Structure A (606). Another RF signal component travels along path p2, reflects off of Structure B (608) and travels along path P3 before reaching the GNSS receiver antenna at Location A. Due to this multipath effect, the RSSI signature received by the GNSS receiver is attenuated from what would be expected from direct RF signal reception.

The Location A data, including the raw GNSS data, RSSI signature, inertial sensor data (e.g., gyro measurements) and a timestamp are uploaded to server 114. The upload can occur through AP 106 and WAN 108 (e.g., the Internet) or through cell tower 110, gateway 112 and WAN 108. Although there is only one user shown, it should be understood that Location A data would be "harvested" from multiple client devices in the vicinity of Location A and periodically uploaded to server 114.

Server 114 runs an enhanced filtering process on the crowd-sourced data (e.g., a smoothing filter, batch estimation) and gets an improved estimate of Location A. The estimate of Location A is associated in database 116 with the attenuated RSSI signature that indicates a multipath environment in the vicinity of Location A. Using augmentation data (e.g., ephemeris data, clock offset, ionospheric delay) or other GNSS augmentation data, the precise locations of the visible GNSS satellites are determined. Using the precise satellite locations, the orientation of the GNSS antenna with respect to the satellite locations (using angular rate data from a gyro), the crowd-sourced estimate of Location A and the attenuated RSSI signature at Location A, the Structures A and B can be georeferenced. A map database or other data source can be consulted to attempt to identify Structures A and B based on the estimate of Location A. If the map database or other data source does not include Structures A and B, the map database or other data source can be updated to include Structures A and B. In this manner, the process described above can be used to survey geographic areas where GNSS signal reception is poor.

Example Client Device Architecture

Figure 7:
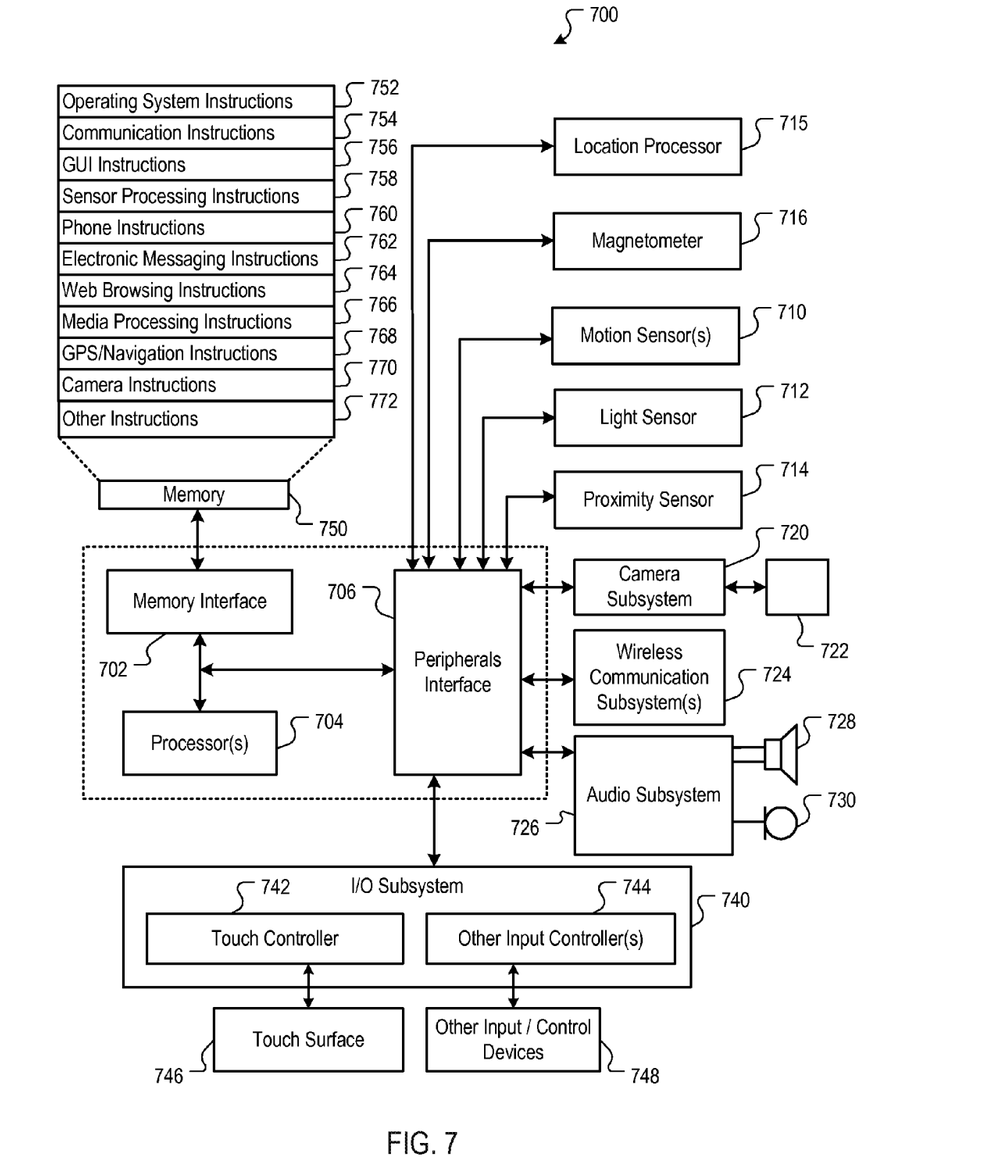
FIG. 7 is a block diagram of example architecture for the client devices described in reference to FIGS. 1-6.

FIG. 7 is a block diagram of example architecture for the client devices 104 described in reference to FIGS. 1-6. Architecture 700 may be implemented in any mobile device for generating the features described in reference to FIGS. 1-5, including but not limited to portable computers, smart phones and tablet computers, game consoles, wearable devices and the like. Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor 710, light sensor 712, and proximity sensor 714 may be coupled to peripherals interface 706 to facilitate orientation, lighting, and proximity functions of the device. For example, in some implementations, light sensor 712 may be utilized to facilitate adjusting the brightness of touch surface 746. In some implementations, motion sensor 710 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 706, such as a temperature sensor, barometric pressure sensor, a biometric sensor, or other sensing device, to facilitate related functionalities.

Location processor 715 (e.g., GPS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used as an electronic compass.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 724. Communication subsystem(s) 724 may include one or more wireless communication subsystems. Wireless communication subsystem(s) 724 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 724 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 726 may be coupled to a speaker 728 and one or more microphones 730 to facilitate voice-enabled functions, such as voice recognition, voice replication, digital recording, and telephony functions.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some implementations, device 700 may present recorded audio and/or video files, such as MP3, AAC, and MPEG video files. In some implementations, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 may include a kernel (e.g., UNIX kernel).

Memory 750 may also store communication instructions 754 to facilitate communicating with one or more additional devices, one or more computers or servers, including peer-to-peer communications, as described in reference to FIGS. 1-6. Communication instructions 754 may also be used to select an operational mode or communication medium for use by the device, based on a geographic location (obtained by the GPS/Navigation instructions 768) of the device. Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes; camera instructions 770 to facilitate camera-related processes and functions; and other instructions 772 for performing some or all of the processes, as described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs).

Exemplary Server Architecture

Figure 8:
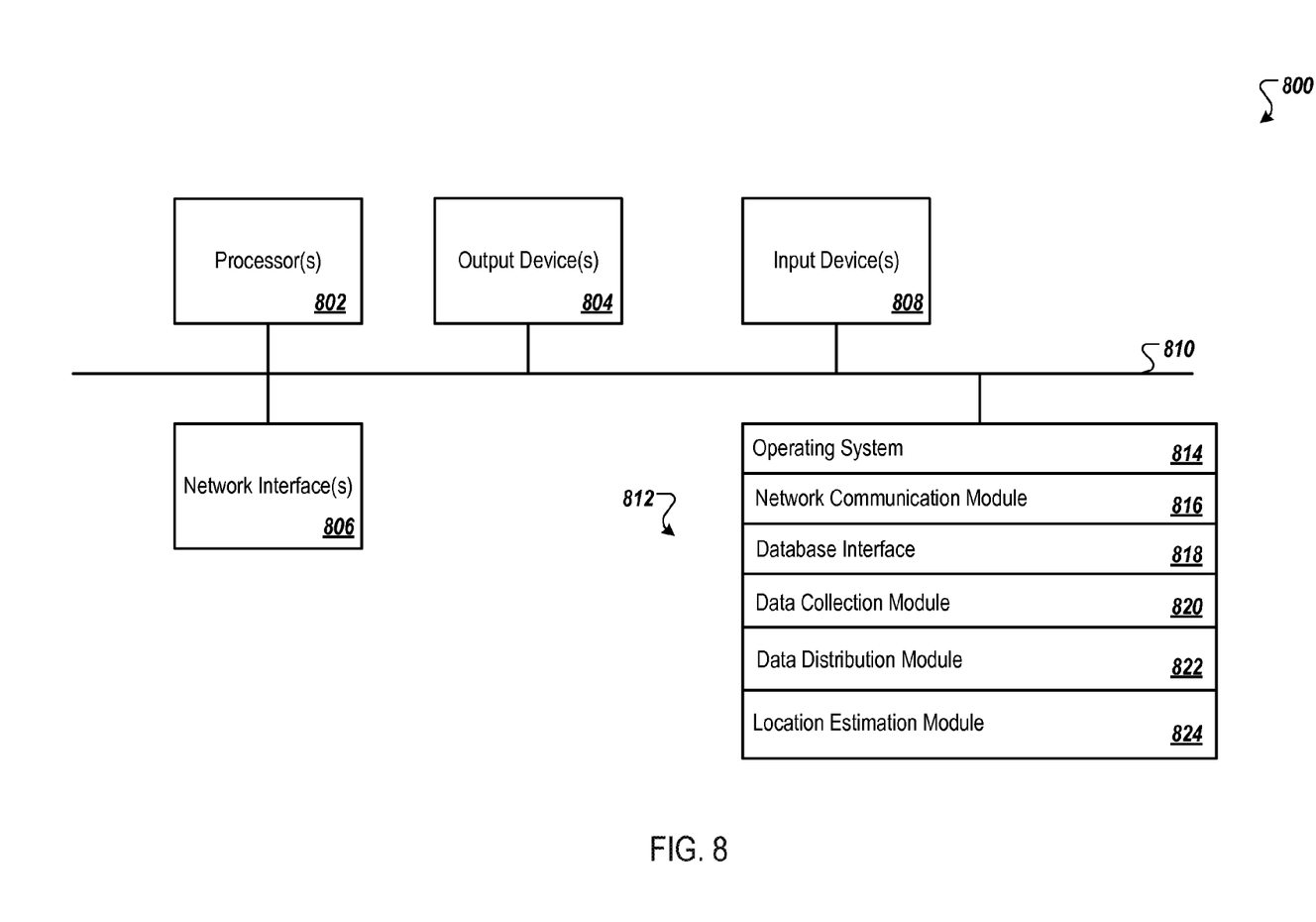
FIG. 8 is a block diagram of example architecture for the server computer described in reference to FIGS. 1-6.

FIG. 8 is a block diagram of example architecture for the server computer 114 described in reference to FIGS. 1-6. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows® NT server), network communication module 816, database interface 818, data collection module 820, data distribution module 822, and location calculation module 824. Database interface 818 can provide access to one or more databases (e.g., database 116). Data collection module 820 provides processes for collecting crowd-sourced data from client devices and storing the data in the one or more databases using database interface 818. Data distribution module 822 provides georeference data 306 to client devices, which in some applications can be used by the client devices to estimate the current locations of the client devices. Location calculation module 824 provides processes for georeferencing geodata, such as estimating the locations of WiFi access points of a wireless network.

Operating system 814 can be multi-user, multiprocessing, multitasking, multithreading, realtime, etc. Operating system 814 performs basic tasks, including but not limited to: recognizing input from and providing output to devices 806, 808; keeping track of and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.).

Architecture 800 can be included in any computer device, including one or more server computers each having one or more processing cores. Architecture 800 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a server computer, raw Global Navigation Satellite System (GNSS) data and wireless scan data obtained from client devices in communication with a wireless network, where the wireless scan data is received from one or more wireless access points of the wire network, and where the raw GNSS data is crowd-sourced, by the server computer from GNSS receivers of the client devices and includes at least one of pseudo-range measurements, delta pseudo-range measurements or Doppler shift measurements;
georeferencing, by the server computer, the one or more wireless access points using raw GNSS data and wireless scan data; and
sending, by the server computer, the georeferenced locations of the wireless access points to a client device.

2. The method of claim 1, further comprising:
receiving augmentation data from sources other than the client devices; and
georeferencing the one or more wireless access points using the raw GNSS data, wireless scan data and the augmentation data.

3. The method of claim 2, where the augmentation data includes data for reducing spatially or temporally correlated measurement error sources.

4. The method of claim 2, where the augmentation data includes data related to time or GNSS satellites.

5. The method of claim 2, where the augmentation data includes differential Global Positioning System (DGPS) data.

6. The method of claim 1, wherein georeferencing the one or more wireless access points using the raw GNSS data and wireless scan data includes processing the crowd-sourced data using batch estimation or a smoothing filter.

7. The method of claim 6, wherein the smoothing filter includes a forward pass estimation followed by a backward recursion.

8. The method of claim 6, wherein the batch estimation includes iterative least-squares estimation.

9. The method of claim 1, further comprising:
georeferencing a structure in a multipath environment based on the crowd-sourced raw GNSS data and a radio frequency signature; and
updating a map database with the georeferenced structure.

10. A method comprising:
sending, by a client device, a request to a server computer for estimated locations of wireless access points detected in a wireless scan by the client device;
receiving estimated locations of the wireless access points from the server computer, where the estimated locations are derived from at least one of pseudo-range measurements, delta pseudo-range measurements or Doppler shift measurements crowd-sourced, by the server computer from a plurality of Global Navigation Satellite System (GNSS) receivers; and
calculating an estimated location of the client device using the estimated locations of the wireless access points, where the method is performed by one or more hardware processors.

11. A system comprising:
one or more processors;
memory coupled to the one or more processors and configured for storing instructions, which, when executed by the one or more processors, causes the one or more processors to perform operations comprising:
receiving raw Global Navigation Satellite System (GNSS) data and wireless scan data obtained from client devices in communication with a wireless network, where the wireless scan data is received from one or more wireless access points of the wireless network, and where the raw GNSS data is crowd-sourced, by the server computer from GNSS receivers of the client devices and includes at least one of pseudo-range measurements, delta pseudo-range measurements or Doppler shift measurements;
georeferencing the one or more wireless access points using the raw GNSS data and wireless scan data; and
sending, by the server computer, the georeferenced locations of the wireless access points to a client device.

12. The system of claim 11, further comprising:
receiving augmentation data from sources other than the client devices; and georeferencing the one or more wireless access points using the raw GNSS data, wireless scan data and the augmentation data.

13. The system of claim 12, where the augmentation data includes data for reducing spatially or temporally correlated measurement error sources.

14. The system of claim 12, where the augmentation data includes data related to time or GNSS satellites.

15. The system of claim 12, where the augmentation data includes differential Global Positioning System (DGPS) data.

16. The system of claim 11, wherein georeferencing the one or more wireless access points using the raw GNSS data and wireless scan data includes processing the crowd-sourced data using batch estimation or a smoothing filter.

17. The system of claim 16, wherein the smoothing filter includes a forward pass estimation followed by a backward recursion.

18. The system of claim 16, wherein the batch estimation includes iterative least-squares estimation.

19. The system of claim 11, further comprising:
georeferencing a structure in a multipath environment based on the crowd-sourced raw GNSS data and a radio frequency signature; and
updating a map database with the georeferenced structure.

20. An apparatus comprising:

one or more processors; and memory coupled to the one or more processors and configured for storing instructions, which, when executed by the one or more processors, causes the one or more processors to perform operations comprising:

sending a request to a server computer for estimated locations of wireless access points detected in a wireless scan by the apparatus;

receiving estimated locations of the wireless access points from the server computer, where the estimated locations are derived from at least one of pseudo-range measurements, delta pseudo-range measurements or Doppler shift measurements crowd-sourced, by the server computer from a plurality of Global Navigation Satellite System (GNSS) receivers;

and calculating an estimated location of the apparatus using the estimated locations of the wireless access points.

* * * * *

UNITED STATES PATENT AND TRADEMARK OFFICE
CERTIFICATE OF CORRECTION

PATENT NO. : 9,791,572 B2
APPLICATION NO. : 14/501381
DATED : October 17, 2017
INVENTOR(S) : Glenn Donald MacGougan, Robert Mayor and Ronald K. Huang Page 1 of 1

It is certified that error appears in the above-identified patent and that said Letters Patent is hereby corrected as shown below:

In the Claims

Column 13, Line 57, delete "wire" and insert -- wireless --; and

Column 13, Line 63, after "using" insert -- the --.

Signed and Sealed this
Fifth Day of March, 2019

Andrei Iancu
*Director of the United States Patent and Trademark Office*